United States Patent
McConnell et al.

(10) Patent No.: US 6,573,203 B1
(45) Date of Patent: Jun. 3, 2003

(54) HIGH UTILITY TOWEL

(75) Inventors: Wesley James McConnell, Alpharetta, GA (US); Jay Chiehlung Hsu, Alpharetta, GA (US); Joseph Mitchell, Alpharetta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/115,545

(22) Filed: Jul. 15, 1998

(51) Int. Cl.[7] .............. B32B 5/26; B32B 5/28; B32B 9/06; B32B 27/04
(52) U.S. Cl. ............. 442/79; 428/485; 428/534; 428/535; 428/536; 442/81; 442/84; 442/153; 442/159; 604/378; 604/381; 604/382; 162/112; 162/113; 162/123; 162/125; 162/127; 162/134; 162/135; 162/164.4; 162/172
(58) Field of Search .............. 428/95, 96, 97, 428/534, 535, 536, 485, 452; 604/378, 381, 382; 162/122, 113, 125, 127, 123, 135, 134, 164.4, 172; 442/85, 86, 153, 159, 81, 84, 87, 90, 154, 155, 79; 5/500, 502

(56) References Cited

U.S. PATENT DOCUMENTS

| | | | | |
|---|---|---|---|---|
| 3,598,696 A | 8/1971 | Beck | ............ | 162/298 |
| 3,695,985 A | 10/1972 | Brock et al. | ............ | 428/198 |
| 3,903,342 A | 9/1975 | Roberts, Jr. | ............ | 428/153 |
| 3,953,638 A | 4/1976 | Kemp | ............ | 428/154 |
| 4,075,382 A | 2/1978 | Chapman et al. | ............ | 428/192 |
| 4,082,886 A * | 4/1978 | Butterworth et al. | ............ | 428/284 |
| 4,100,017 A | 7/1978 | Flautt, Jr. | ............ | 162/111 |
| 4,113,911 A | 9/1978 | LaFitte et al. | ............ | 428/284 |
| 4,145,464 A | 3/1979 | McConnell et al. | ............ | 428/171 |
| 4,166,001 A | 8/1979 | Dunning et al. | ............ | 162/111 |
| 4,196,245 A | 4/1980 | Kitson et al. | ............ | 428/198 |
| 4,207,367 A | 6/1980 | Baker, Jr. | ............ | 428/171 |
| 4,239,792 A | 12/1980 | Ludwa | ............ | 428/198 |
| 4,287,251 A | 9/1981 | King et al. | ............ | 428/198 |
| 4,298,649 A | 11/1981 | Meitner | ............ | 428/198 |
| 4,326,000 A | 4/1982 | Roberts, Jr. | ............ | 428/153 |

(List continued on next page.)

FOREIGN PATENT DOCUMENTS

| | | |
|---|---|---|
| EP | 0144658 A1 | 5/1985 |
| EP | 0359615 | 3/1990 |
| WO | 90/00363 | 1/1990 |
| WO | 98/13549 | 4/1998 |
| WO | WO 0000698 | 1/2000 |

OTHER PUBLICATIONS

Counterpart PCT International Search Report, mailed Oct. 5, 1999.

Encyclopedia of Chemical Technology, 3rd Edition, vol. 24, pp. 442–451, Jul. 1986.*

Primary Examiner—Paul Thibodeau
Assistant Examiner—Ramsey Zacharia
(74) Attorney, Agent, or Firm—Dority & Manning, P.A.

(57) ABSTRACT

The present invention may provide a towel desirably including first and second layers having cellulosic fibers and a repellant agent. The first and second layers may substantially sandwich a third layer having cellulosic fibers with higher absorbency than the first and second layers. All three layers may form a single ply.

27 Claims, 3 Drawing Sheets

U.S. PATENT DOCUMENTS

| | | | |
|---|---|---|---|
| 4,377,615 A | 3/1983 | Suzuki et al. | 428/213 |
| 4,436,780 A | 3/1984 | Hotchkiss et al. | 428/198 |
| 4,445,974 A | 5/1984 | Stenberg | 162/300 |
| 4,469,735 A | 9/1984 | Trokhan | 428/154 |
| 4,537,822 A | 8/1985 | Nanri et al. | 428/212 |
| 4,548,856 A | 10/1985 | Ali Khan et al. | 428/171 |
| 4,610,915 A | 9/1986 | Crenshaw et al. | 428/219 |
| 4,618,524 A | 10/1986 | Groitzsch et al. | 428/198 |
| 4,816,320 A | 3/1989 | St. Cyr | 428/198 |
| 4,879,170 A | 11/1989 | Radwanski et al. | |
| 4,885,202 A | 12/1989 | Lloyd et al. | 428/171 |
| 4,958,798 A | 9/1990 | Parker | |
| 5,048,589 A | 9/1991 | Cook et al. | 162/109 |
| 5,087,324 A | 2/1992 | Awofeso et al. | 162/111 |
| 5,102,501 A | 4/1992 | Eber et al. | |
| 5,151,320 A | 9/1992 | Homonoff et al. | |
| 5,192,388 A | 3/1993 | Schöllkopf et al. | 156/324 |
| 5,399,412 A | 3/1995 | Sudall et al. | 428/153 |
| 5,403,392 A * | 4/1995 | Craig | 106/162 |
| 5,514,435 A * | 5/1996 | Suzuki et al. | 428/40 |
| 5,543,202 A | 8/1996 | Clark et al. | 428/154 |
| 5,601,871 A | 2/1997 | Krzysik et al. | 427/288 |
| 5,607,551 A | 3/1997 | Farrington, Jr. et al. | 162/109 |
| 5,616,207 A | 4/1997 | Sudall et al. | 156/246 |
| 5,620,565 A | 4/1997 | Lazorisak et al. | 162/72 |
| 5,700,254 A * | 12/1997 | McDowall et al. | 604/378 |
| 5,733,273 A * | 3/1998 | Ahr | 604/378 |
| 5,865,824 A * | 2/1999 | Chen et al. | 604/378 |
| 5,981,739 A * | 11/1999 | Anderson et al. | 536/80 |

\* cited by examiner

HIGH UTILITY TOWEL

FIELD OF THE INVENTION

This invention generally relates to the field of paper making, and more specifically, to a high utility towel.

BACKGROUND

After hand washing, typically a paper-based hand towel is used to dry one's hands, particularly in public restrooms. Often, a towel is used until its outer layers are wet. At that point, the wet towel is disposed and another towel may be dispensed to continue drying. Unfortunately, this practice fails to use the full absorptive capacity of the hand towel. Although the outer layers of the used towels are wet, they may still have absorptive capacity. Consequently, the failure to utilize this capacity wastes towels.

Accordingly, a hand towel that remains dry on its surface will reduce hand towel use by allowing the utilization of substantially the entire absorbency capacity of the towel, thereby reducing towel consumption rates and waste.

Definitions

As used herein, the term "comprises" refers to a part or parts of a whole, but does not exclude other parts. The term "comprises" has the same meaning and is interchangeable with the terms "includes" and "has ".

As used herein, the term "repellant agent" refers to an agent that resists absorption of a liquid, desirably an aqueous liquid. The repellant agent may be hydrophobic and includes materials such as sizing agents, silicon, waxes, and latexes.

As used herein, the term "latex" refers to a colloidal water dispersion of high polymers from sources related to natural rubber, such as Hevea tree sap, or synthetic high polymers resembling natural rubber. Synthetic latexes are made by emulsion polymerization techniques from styrene-butadiene copolymer, acrylate resins, polyvinyl acetate, and similar materials.

As used herein, the term "silicon" refers to a nonmetallic element or any compounds incorporating this element, such as the organosiloxane. Organosiloxane is any of a large group of siloxane polymers based on a structure consisting of alternate silicon and oxygen atoms with various organic radicals attached to the silicon. An exemplary silicon material is sold under the trade designation DOW 929 by Dow Chemical of Midland, Mich.

As used herein, the term "layer" refers to a single thickness, course, stratum, or fold that lays or lies over or under another. An exemplary several layered structure is depicted in FIG. 1, where a towel 10 includes five layers 14, 18, 22, 30 and 34.

As used herein, the term "ply" refers to a material produced from a headbox having one or more layers. An exemplary towel having a two-ply structure is depicted in FIG. 2, where a towel 50 includes two plies 54A and 54B.

As used herein, the term "wax" refers to an aqueous emulsion of small particles held in suspension by an emulsifying agent. Exemplary waxes include paraffin waxes, microcrystalline wax, or other waxes. An exemplary wax compound that may be printed onto paper products is disclosed in U.S. Pat. Nos. 5,601,871, 5,614,293, and 5,665, 426, which are hereby incorporated by reference.

As used herein, the term "sizing agent" refers to any chemical inhibiting liquid penetration of cellulosic fiber structures. Suitable sizing agents are disclosed in a text entitled "Cellulosic and Paper Board Making," second edition, Volume III, edited by R. G. MacDonald, and J. N. Franklin, which is hereby incorporated by reference.

Particularly suitable sizing agents are acid or alkaline sizes such as acid rosin, alkenyl succinic anhydride, alkyl ketone dimers and alkenol ketene dimers of the formula:

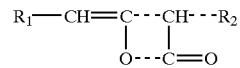

wherein $R_1$ and $R_2$ are based on $C_{16}$–$C_{18}$, aliphatic carbon chains, which can be the same or different. Exemplary commercially available sizing agents of this type are HERCON 79, HERCON 1332, and PRECIS 3000 from Hercules, Inc., Wilmington, Del.

As used herein, the term "cellulose" refers to a natural carbohydrate high polymer (polysaccharide) having the chemical formula $(C_5H_{10}O_5)_n$ and consisting of anhydroglucose units joined by an oxygen linkage to form long molecular chains that are essentially linear. Natural sources of cellulose include deciduous and coniferous trees, cotton, flax, esparto grass, milkweed, straw, jute, hemp, and bagasse.

As used herein, the term "pulp" refers to processed cellulose.

As used herein, the term "absorbency" refers to the rate material completely soaks up a given quantity of a liquid over a specified time period. The absorbency rate of unsized papers may be measured using test procedure ASTM number D 824-94 and sized papers may be measured using test procedure ASTM number D 779.

As used herein, the term "absorbency gradient" refers to the different absorbency capacity of various layers or plies in a towel product. Desirably, the inner layers or plies of the towel have greater absorbency than the outer layers.

As used herein, the term "wicking" refers to the rate at which a liquid is absorbed into a material as a result of capillary action. Results are typically reported as centimeter per minute. During testing, an about 25 millimeter by about 200 millimeter sample free of folds, wrinkles, and distortions is vertically and partially suspended in liquid, typically oil or water, at about 23 degrees Celsius and 50 percent relative humidity. Often, about 25 millimeter of the 200 millimeter sample length is immersed in the liquid. A weight may be attached to this end to prevent curling. The height of the leading edge of the liquid to the liquid surface is recorded at various time intervals, such as 0.25, 0.5, 0.75, and 1.0 minute, to determine the wicking rate.

As used herein, the term "wicking gradient" refers to the different wicking capacity of various layers or plies in a towel product. Desirably, the inner layers or plies of the towel have greater wicking than the outer layers.

As used herein, the term "sulfite pulp" refers to pulp processed chemically with a mixture of sulfurous acid and bisulfite ion, which attack and solubilize the lignin in the pulp feedstock.

As used herein, the term "bleached-chemical-thermo-mechanical pulp" refers to processing cellulosic material with steam, pressure and sodium sulfite or hydrogen peroxide to soften wood lignin between and within cell walls. Furthermore, alkaline peroxide bleaching is added to further soften and brighten the cellulose fibers. The term bleached-chemical-thermo-mechanical pulp may be hereinafter abbreviated as "BCTMP".

As used herein, the term "basis weight" (hereinafter may be referred to as "BW") is the weight per unit area of a sample and may be reported as gram-force per meter squared (hereinafter may be abbreviated as "gsm"). The basis weight may be measured using test procedure ASTM D 3776-96 or TAPPI Test Method T-220.

SUMMARY OF THE INVENTION

The problems and needs described above are addressed by the present invention, which provides a towel desirably including first and second layers having cellulosic fibers and a repellant agent. The first and second layers may substantially sandwich a third layer having cellulosic fibers with higher absorbency than the first and second layers. All three layers may form a single ply.

Furthermore, the towel may also include fourth and fifth layers positioned between, respectively, the first and third layers and the second and third layers. The fourth and fifth layers may have cellulosic fibers with higher wicking than the first and second layers.

In addition, the repellant agent may be wax, latex, a sizing agent, and/or silicon. Moreover, the repellant agent may be printed and/or sprayed onto at least one of the first or second layers. Furthermore, the repellant agent may be mixed with the fibers of at least one of the first or second layers in a headbox. What is more, the first or second layers may include sulfite pulp or BCTMP and the towel may have a basis weight from about 8 gsm to about 59 gsm. Furthermore, the third layer may have higher absorbency and wicking than the fourth and fifth layers.

Another embodiment of a towel may include a first ply further including a first layer having cellulosic fibers and a repellant agent, a second layer having cellulosic fibers with higher wicking than the first layer, and a third layer having cellulosic fibers with higher absorbency than the first and second layers. The second layer may be positioned proximate to the first layer and the third layer may be positioned proximate to the second layer. A second ply may be bonded to the first ply and be generally a mirror image thereof.

In addition, the repellant agent may be wax, latex, a sizing agent, and/or silicon. Moreover, the repellant agent may be printed and/or sprayed onto at least one of the first or second layers. Furthermore, the repellant agent may be mixed with the fibers of at least one of the first or second layers in a headbox. What is more, the first or second layers may include sulfite pulp or BCTMP and the towel may have a basis weight from about 8 gsm to about 59 gsm. Moreover, the third layer may have higher wicking than the second layer.

DETAILED DESCRIPTION OF THE PREFERRED EMBODIMENT(S)

Figure 1:
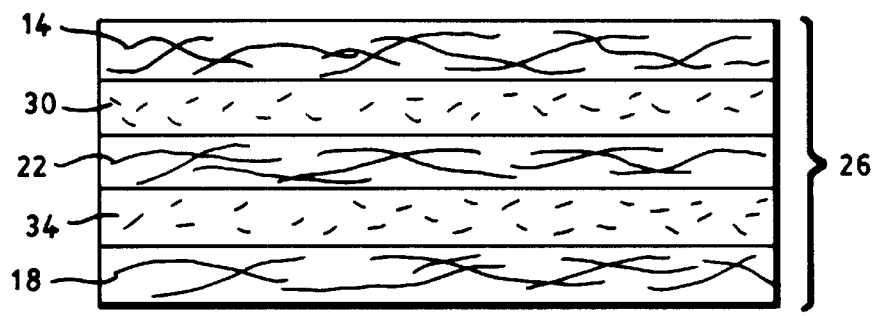
FIG. 1 is a magnified, but not necessarily to scale, side elevational view of one embodiment of a towel.
Figure 2:
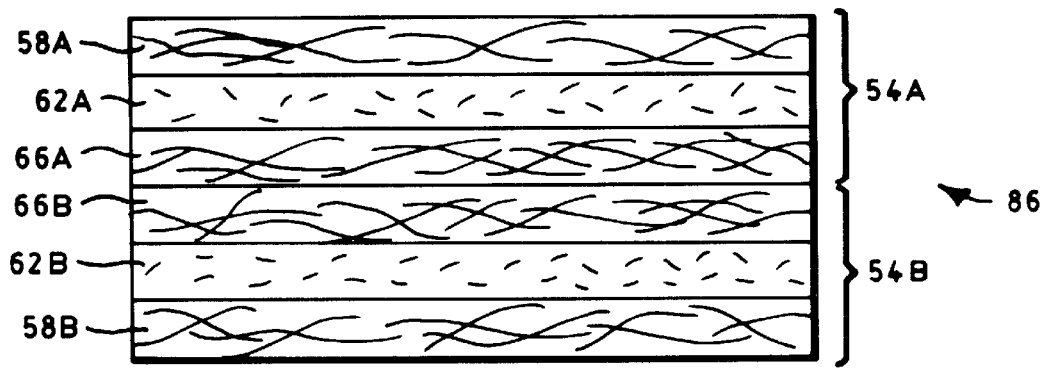
FIG. 2 is a magnified, but not necessarily to scale, side elevational view of another embodiment of a towel.

Referring now to the drawings, like reference numerals designate corresponding structure throughout the views and like reference numerals used in conjunction with sequentially ordered upper case letters refer to a series of substantially identical items or components. Referring in particular to FIGS. 1–2, there are two embodiments of towels 10 and 50.

The towel 10 may include a first ply 26, further including a first layer 14, a second layer 18, a third layer 22, a fourth layer 30 and a fifth layer 34. The first and second layers 14 and 18 may be positioned on the outer surfaces of the towel 10. These layers 14 and 18 may be formed from pulp, such as sulfite pulp and BCTMP, although other pulps may be used as well. Often, sulfite pulp and BCTMP are more hydrophobic than Kraft fibers.

Desirably, the first and second layers 14 and 18 are pattern-coated with a repellant agent to provide hydrophobic properties, such as lacking an affinity for water or water-based solutions, although the agent may be mixed in with the fibers or sprayed onto the fibers as well. The repellant agent may repel liquids by filling interstitial voids in the fibrous structure of the layers 14 and 18 or coating individual fibers preventing liquids from being absorbed and passing through the fibers to the interior of the fibrous structure. An exemplary repellant agent is a hydrophobic chemical sold under the trade designation REACTOPAQUE by Sequa Chemicals, Inc. at One Sequa Dr., Chester, S.C. 29706. The amount of the repellant agent added to the fibers may be from about 1 to about 30 pounds per ton of fiber, more specifically from about 1.2 to about 20 pounds per ton of fiber, and still more specifically, from about 2 to about 10 pounds per ton of fiber.

Pattern coating may provide enough open pores for liquid to penetrate to the inner layers 22, 30, and 34, but prevent the absorption of water in the fibers of the layers 14 and 18. Thus, the outer layers 14 and 18 of the towel 10 remain dry during use and permit the transfer of liquid to the inner layers 22, 30, and 34 of the towel 10, thereby allowing the use of substantially the full absorptive capacity of the towel 10. Repellant agents may include waxes, latexes, silicon, and sizing agents.

Often sizing agents are commonly added to control the penetration of aqueous liquids into paper or other fibrous structures. In many cases, a certain resistance is required for end use. When surface treatments are applied with conventional equipment, such as sprayers or applicators, often sizing is required in the base sheet to control pickup of the aqueous solution. Paper grades such as butcher's wrap, milk carton, linerboard, bleached and unbleached bag, fine paper, cylinder board, newsprint and corrugated medium are routinely sized.

Internal sizing agents, which are those applied to the fibers within the paper structure, provide a reduced rate of penetration by retarding the rate of flow through the inter-fiber capillaries, as measured by test procedure ASTM D 779-94. When sizing is accomplished, the contact angle at the fiber surface is increased, as measured by test procedure ASTM D 5725-95 or TAPPI Test Method T-458. Internal sizing agents function through the use of low surface energy, which when attached to the surface of cellulose, reduce the surface energy of the fiber surface.

The amount of the sizing agent added to the fibers in the layers 14 and 18 may be from about 1 to about 10 pounds per ton of fiber, more specifically from about 1.5 to about 3 pounds per ton of fiber, and still more specifically, from about 2 to about 2.5 pounds per ton of fiber.

The fourth and fifth layers 30 and 34 may be positioned inside of, respectively, the first and second layers 14 and 18, and sandwich the third layer 22. Desirably, these layers 30 and 34 may be formed from cellulosic material and have higher wicking and adsorption properties than the layers 14 and 18 to transfer the liquid to the layer 22. Desirably, these layers 30 and 34 will be thin in relation to the other layers 14, 18, and 22 for transferring liquid.

Desirably, the third layer 22 may reside in the center of the towel 10 and may include cellulosic fibers. Desirably, the third layer 22 has greater wicking and absorption properties than the layers 14, 18, 30, and 34, thereby creating wicking and absorption gradients in the towel 10. These gradients draw liquid from the towel's 10 outer surfaces to its interior, where it is spread and absorbed throughout the layer 22. The gradients also prevent liquid from migrating from the interior to the surface.

The basis weight of the towel 10 may range from about 8 gsm to about 59 gsm, desirably from about 17 gsm to about 34 gsm, and more desirably about 27 gsm. The towel 10 is made from cellulose materials that may be modified by various treatments such as, for example, thermal, chemical and/or mechanical treatments. It is contemplated that reconstituted cellulose material may be used and/or blended with other cellulose material. Desirably, no synthetic fibers are woven into the cellulosic material.

The towel 50 may include a first ply 54A having a first layer 58A, a second layer 62A, and a third layer 66A and a second ply 54B having a first layer 58B, a second layer 62B, and a third layer 66B. The second ply 54B may be a substantial mirror image 86 of the first ply 54A forming a palindromic structure. As a result, only the first ply 54A will be discussed in detail hereinafter.

Desirably, the ply 54A includes the first layer 58A, second layer 62A, and third layer 66A. The first layer 58A may be positioned on the outer surfaces of the towel 50 and may be formed from pulp, such as sulfite pulp and BCTMP, although other pulps may be used as well.

Desirably, the first layer 58A is pattern-coated with a repellant agent to provide hydrophobic properties, although the agent may be mixed in with the fibers or sprayed onto the fibers as well. The repellant agent may repel liquids by filling interstitial voids in the fibrous structure of the layer 58A or coating individual fibers preventing liquids from being absorbed and passing through the fibers to the interior of the fibrous structure. An exemplary repellant agent is a hydrophobic chemical sold under the trade designation REACTOPAQUE by Sequa Chemicals, Inc. at One Sequa Dr., Chester, S.C. 29706. The amount of the repellant agent added to the fibers may be from about 1 to about 30 pounds per ton of fiber, more specifically from about 1.2 to about 20 pounds per ton of fiber, and still more specifically, from about 2 to about 10 pounds per ton of fiber.

Pattern coating may provide enough open pores for liquid to penetrate to the interior of the towel 50, but prevent the absorption of water in the fibers of the outer layer 58A. Thus, the outer layer 58A remains dry during use and permits the transfer of liquid to the interior of the towel 50, thereby allowing the use of the full absorptive capacity of the towel 50. Repellant agents may include waxes, latexes, silicon, and sizing agents.

Often sizing agents are commonly added to control the penetration of aqueous liquids into paper or other fibrous structures. In many cases, a certain resistance is required for end use. When surface treatments are applied with conventional equipment, such as sprayers or applicators, often sizing is required in the base sheet to control pickup of the aqueous solution. Paper grades such as butcher's wrap, milk carton, linerboard, bleached and unbleached bag, fine paper, cylinder board, newsprint and corrugated medium are routinely sized.

Internal sizing agents, which are those applied to the fibers within the paper structure, provide a reduced rate of penetration by retarding the rate of flow through the inter-fiber capillaries, as measured by test procedure ASTM D 779-94. When sizing is accomplished, the contact angle at the fiber surface is increased, as measured by test procedure ASTM D 5725-95 or TAPPI Test Method T-458. Internal sizing agents function through the use of low surface energy, which when attached to the surface of cellulose, reduce the surface energy of the fiber surface.

The amount of the sizing agent added to the fibers in the layers 14 and 18 may be from about 1 to about 10 pounds per ton of fiber, more specifically from about 1.5 to about 3 pounds per ton of fiber, and still more specifically, from about 2 to about 2.5 pounds per ton of fiber.

The second layer 62A may be positioned inside of the first layer 58A and may be formed from cellulosic material. Desirably, the layer 62A has higher wicking properties than the layer 58A to transfer the liquid to the interior. Desirably, the layer 62A will be thin in relation to the other layers 58A and 66A for transferring liquid.

Desirably, the third layer 66A resides substantially in the center of the towel 50 and may include cellulosic fibers. Desirably, the third layer 66A has greater absorption and wicking properties than the layers 58A and 62A, thereby creating wicking and absorbent gradients in the towel 50. These gradients pull liquid from the towel's 50 outer surfaces to its interior where it is spread and absorbed throughout the layer 66A. The gradients also prevent liquid from migrating from the interior to the surface.

The basis weight of the towel 50 may range from about 8 gsm to about 59 gsm, desirably from about 17 gsm to about 34 gsm, and more desirably about 27 gsm. The towel 50 is made from cellulose materials that may be modified by various treatments such as, for example, thermal, chemical and/or mechanical treatments. It is contemplated that reconstituted cellulose material may be used and/or blended with other cellulose material. Desirably, no synthetic fibers are woven into the cellulosic material.

The plies 54A–B may be formed from pulp fibers using any suitable papermaking techniques, and one such exemplary technique will be hereinafter described.

Figure 3:
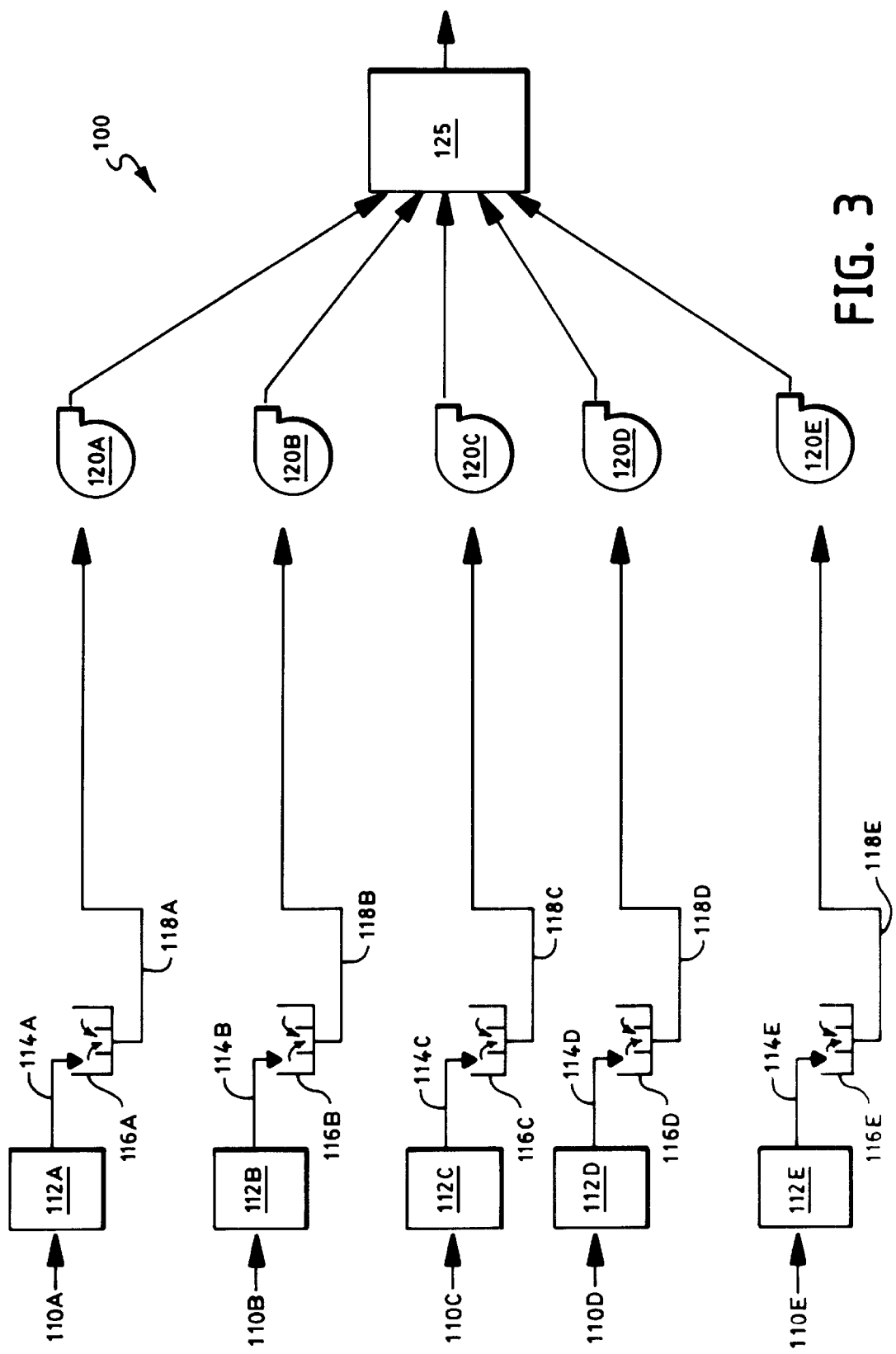
FIG. 3 is an illustration of an exemplary process for making a towel.

FIG. 3 depicts an exemplary process 100 for forming a ply 26 of the towel 10. The process 100 may include wet stock lines 110A–E. Because wet stock lines 110A–E may be substantially identical, only wet stock line 110A will be described in detail hereinafter.

The wet stock line 110A may include a chest 112A, a stuffbox 116A, and a fan pump 120A. Desirably, the chest 112A stores an aqueous suspension of cellulosic fibers, which is fed via a stream 114A to the stuffbox 116A for maintaining a constant pressure head. The cellulosic fibers may be sulfite pulp or BCTMP, particularly for the outermost layers 14 and 18 of the towel 10. An outlet stream 118A of the stuffbox 116A may be sent to the fan pump 120A. A discharge from the fan pump 120A may be then sent to a layered headbox 125.

Afterwards, the pulp from the headbox 125 may be sent to a paper forming line for forming the towel 10, such as those disclosed in U.S. Pat. No. 5,048,589, which are hereby incorporated by reference. The towel 10 may be pattern-coated with a repellant agent at a size press prior to drying. Alternatively, the repellant agent may be added to the headboxes 110A and 110E, or sprayed onto the outer surfaces of the towel 10.

Figure 4:
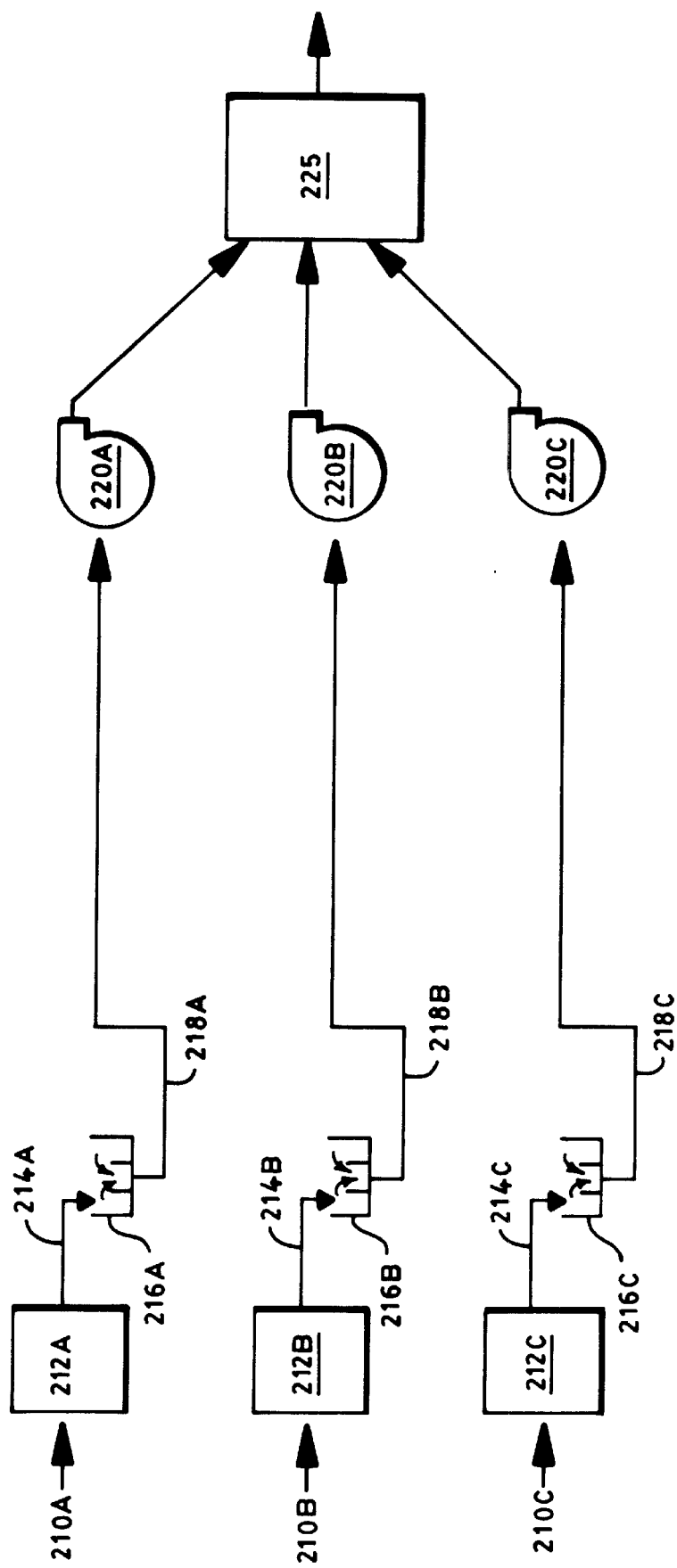
FIG. 4 is an illustration of another exemplary process for making a towel.

FIG. 4 depicts an exemplary process 200 for forming a ply 54A of the towel 50. The process 200 may include wet stock lines 210A–C. Wet stock lines 210A–C may be substantially identical, therefore, only the wet stock line 210A may be described in detail hereinafter.

The wet stock line 210A may include a chest 212A, a stuffbox 216A, and a fan pump 220A. Desirably, the chest 212A stores an aqueous suspension of cellulosic fibers, which is fed via a stream 214A to the stuffbox 216A for maintaining a constant pressure head. The cellulosic fibers may be sulfite pulp or BCTMP, particularly for the layer 58A of the ply 54A. An outlet stream 218A of the stuffbox 216A may be sent to the fan pump 220A. A discharge from the fan pump 220A may be then sent to a layered headbox 225.

Afterwards, the pulp from the headbox 225 may be sent to a paper forming line for forming the towel 50, such as those disclosed in U.S. Pat. No. 5,048,589, which are hereby incorporated by reference. The towel 50 may be pattern-coated with a repellant agent at a size press prior to drying. Alternatively, the repellant agent may be added to the headboxes 210A or other locations, such as a stockchest, or sprayed onto the outer surface of the ply 54A. The ply 54B may be formed in substantially the same manner as described for the ply 54A. Once formed, the ply 54B may be bonded to the ply 54A using any suitable means, such as adhesives, or a knurling or ply-bonding wheel. Exemplary bonding techniques are disclosed in U.S. Pat. Nos. 5,698,291, 5,622,734, and 5,543,202, which are hereby incorporated by reference. If a knurling wheel is utilized, desirably only the edges of the plies 54A–B may be bonded together.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A towel, comprising:
   first and second layers having cellulosic fibers and a repellant agent;
   a third layer having cellulosic fibers with higher absorbency than the first and second layers; and
   fourth and fifth layers positioned between, respectively, the first and third layers and the second and third layers wherein the fourth and fifth layers consist essentially of cellulosic fibers, wherein said fourth and fifth layers have a higher wicking rate than the first and second layers, respectively, and wherein the third layer has a higher wicking rate than said fourth and fifth layers;
   wherein all five layers form a single ply.

2. The towel of claim 1 wherein the repellant agent is wax.

3. The towel of claim 1 wherein the repellant agent is latex.

4. The towel of claim 1 wherein the repellant agent is a sizing agent.

5. The towel of claim 1 wherein the repellant agent is silicon.

6. The towel of claim 1 wherein the repellant agent is printed onto at least one of the first or second layers.

7. The towel of claim 1 wherein the repellant agent is sprayed onto at least one of the first or second layers.

8. The towel of claim 1 wherein the repellant agent is mixed with the fibers of at least one of the first or second layers in a headbox.

9. The towel of claim 1 wherein at least one of the first or second layers has pulp selected from the group consisting of sulfite pulp and BCTMP, and the towel has a basis weight from about 8 gsm to about 59 gsm.

10. The towel of claim 1 wherein the third layer has higher absorbency than the fourth and fifth layers.

11. A towel, comprising:
   a first ply further comprising,
      a first layer having cellulosic fibers and a repellant agent;
      a second layer consisting essentially of cellulosic fibers, said second layer having a higher wicking rate than the first layer, said second layer being positioned proximate to the first layer;
      a third layer having cellulosic fibers with higher absorbency than the first and second layers, said third layer being positioned proximate to the second layer, said third layer having a higher wicking rate than said second layer; and
   a second ply bonded to the first ply, said second ply further comprising:
      a fourth layer having cellulosic fibers and a repellant agent;
      a fifth layer consisting essentially of cellulosic fibers, said fifth layer having a higher wicking rate than the fourth layer, said fifth layer being positioned proximate to the fourth layer;
      a sixth layer having cellulosic fibers with higher absorbency than the fourth and fifth layers, said sixth layer being positioned proximate to both the fifth layer and the third layer, said sixth layer having a higher wicking rate than said fifth layer.

12. The towel of claim 11 wherein the repellant agent is wax.

13. The towel of claim 11 wherein the repellant agent is latex.

14. The towel of claim 11 wherein the repellant agent is a sizing agent.

15. The towel of claim 11 wherein the repellant agent is a silicon.

16. The towel of claim 11 wherein the repellant agent is printed onto the first and fourth layers.

17. The towel of claim 11 wherein the repellant agent is sprayed onto the first and fourth layers.

18. The towel of claim 11 wherein the repellant agent is mixed with the fibers in the first and fourth layers in a headbox.

19. The towel of claim 11 wherein at least one of the first or fourth layers has pulp selected from the group consisting of sulfite pulp and BCTMP, and the towel has a basis weight from about 8 gsm to about 59 gsm.

20. A towel comprising:
   first and second layers having modified cellulosic fibers and a repellant agent;
   a third layer having cellulosic fibers with higher absorbency than said first and second layers; and
   fourth and fifth layers positioned between, respectively, said first and third layers and said second and third layers, wherein said fourth and fifth layers consist essentially of cellulosic fibers, wherein said fourth and fifth layers have a higher wicking rate than said first and second layers, respectively, said third layer having a higher wicking rate than said fourth and fifth layers, wherein the modified cellulosic fibers of said first layer are more hydrophobic than the cellulosic fibers of said fourth layer and the modified cellulosic fibers of said second layer are more hydrophobic than the cellulosic fibers of said fifth layer, wherein the third layer has higher absorbency than the fourth and fifth layers;
   wherein all five layers form a single ply.

21. The towel of claim 20, wherein said repellant agent is selected from the group consisting of wax, latex, a sizing agent, and silicon.

22. The towel of claim 20, wherein said repellant agent is printed onto at least one of said first or second layers.

23. The towel of claim 20, wherein said repellant agent is sprayed onto at least one of said first or second layers.

24. The towel of claim 20, wherein said modified cellulosic fibers of said first and second layers are selected from the group consisting of sulfite pulp and bleached-chemical-thermomechanical pulp.

25. A towel comprising:
   a first ply comprising:
      a first layer having modified cellulosic fibers and a repellant agent;
      a second layer consisting essentially of cellulosic fibers, said second layer having a higher wicking rate than the first layer, said second layer being positioned proximate to said first layer;
      a third layer having cellulosic fibers with higher absorbency than said first and second layers, said third layer being positioned proximate to said second layer, said third layer having a higher wicking rate than said second layer, wherein the modified cellulosic fibers of said first layer are more hydrophobic than the cellulosic fibers of said second layer; and
   a second ply bonded to the first ply, said second ply comprising:
      a fourth layer having modified cellulosic fibers and a repellant agent;
      a fifth layer consisting essentially of cellulosic fibers, said fifth layer having a higher wicking rate than said fourth layer, said fifth layer being positioned proximate to said fourth layer;
      a sixth layer having cellulosic fibers with higher absorbency than said fourth and fifth layers, said sixth layer being positioned proximate to both said third and fifth layers, said sixth layer having a higher wicking rate than said fifth layer, wherein the modified cellulosic fibers of said fourth layer are more hydrophobic than the cellulosic fibers of said fifth layer.

26. The towel of claim 25, wherein said repellant agent is selected from the group consisting of wax, latex, a sizing agent, and silicon.

27. The towel of claim 25, wherein said modified cellulosic fibers of said first and fourth layers are selected from the group consisting of sulfite pulp and bleached-chemical-thermomechanical pulp.

* * * * *